United States Patent [19]
Gruenbauer et al.

[11] Patent Number: 5,808,131
[45] Date of Patent: Sep. 15, 1998

[54] LIQUID URETHANE CONTAINING ADDUCT

[75] Inventors: Henri J. M. Gruenbauer, Oostburg; Camiel F. Bartelink, Enschede, both of Netherlands; Martin Moeller, Ulm, Germany

[73] Assignee: The Dow Chemical Company, Midland, Mich.

[21] Appl. No.: 432,390

[22] Filed: May 1, 1995

[51] Int. Cl.$^6$ .................................................. C04C 261/00
[52] U.S. Cl. ................................ 560/25; 560/20; 560/158
[58] Field of Search .................................. 560/25, 26, 158

[56] References Cited

U.S. PATENT DOCUMENTS

| | | | |
|---|---|---|---|
| 4,079,028 | 3/1978 | Emmons et al. | 260/29.6 NR |
| 4,129,455 | 12/1978 | Thompson et al. | 106/308 N |
| 4,163,749 | 8/1979 | Hauxwell et al. | 260/404.5 |
| 4,246,391 | 1/1981 | Watson, Jr. | 528/49 |
| 5,071,951 | 12/1991 | Ulrich et al. | 528/111 |
| 5,136,009 | 8/1992 | Meixner et al. | 528/49 |
| 5,236,960 | 8/1993 | Harrison et al. | 521/51 |

*Primary Examiner*—Paul F. Shaver

[57] ABSTRACT

Disclosed is a liquid urethane containing adduct; a process for the preparation thereof; and applications therewith. More specifically this invention relates to a stable adduct which is a liquid at room temperature and which contains a plurality of urethane linkages, and yet which is substantially free of any isocyanate functionality or isocyanate-reactive functionality. Such adducts can be used as quenchants, lubricants, or surfactants.

15 Claims, No Drawings

LIQUID URETHANE CONTAINING ADDUCT

BACKGROUND OF INVENTION

This invention relates to a liquid urethane containing adduct; a process for the preparation thereof; and applications therewith. More specifically this invention relates to a stable adduct which is a liquid at room temperature and which contains a plurality of urethane linkages, and yet which is substantially free of any isocyanate functionality or isocyanate-reactive functionality.

In general, urethane containing adducts may be prepared by reaction of organic isocyanates with active hydrogen-containing substances. The reaction may be conducted in the presence of a solvent and various addition sequences of isocyanate with active hydrogen-containing substances employed so as to arrive at an end product which is substantially free of any isocyanate functionality or isocyanate-reactive functionality. Illustrative of such products and various reaction techniques known to the art is that as disclosed by U.S. Pat. No. 4,079,028.

For many applications including the fields of surfactants, for example when manufacturing polyurethane foams, lubricants or quenchants, it is desirable that the adduct have an attractive purity and be a liquid. For polyurethane foam surfactancy applications, purity is an important aspect where the presence of a lower molecular weight adduct can be detrimental, to the extent of being an antifoaming agent, when trying to exploit the foam surfactancy property of a higher molecular weight product. The liquid characteristic of the adduct is highly desirable as it enhances its versatility with respect to applications where stable systems with other substances in the liquid phase is required.

Our present investigations relate to the development of a preparation procedure for a liquid urethane-containing adduct having an improved purity, and to a procedure which will permit the preparation of a liquid urethane-containing adduct, and especially a liquid adduct having a branched structure.

From our investigations, it is now found that such adducts can be prepared via a solvent free process with careful control of the reactants, processing aids, and process conditions. By the term "processing aids", it is understood substances which act as catalyst to reactions involving the isocyanate functionality and especially substances which promote the formation of the urethane linkage.

SUMMARY OF THE INVENTION

In a first aspect, this invention relates to a urethane-containing adduct comprising the reaction product of a monoahl with an isocyanate-terminated intermediate obtained by coupling a polyisocyanate with a polyahl wherein the adduct being substantially free of any isocyanate functionality or any isocyanate-reactive functionality having a number average molecular weight of from about 600 to about 80000 and is a liquid at room temperature.

In a second aspect, this invention relates to a urethane-containing adduct composition which is a liquid at room temperature and the reaction product of a monoahl with an isocyanate-terminated intermediate obtained by coupling a polyisocyanate with a polyahl, based on total mole present of components (a), (b) and (c) and to a total of 100 percent, comprises (a) from about 65 to 100 mole percent of an adduct of the general structure (I);

$$B-(A-M)_f \qquad (I)$$

(b) from less than about 35 to 0 mole percent of an adduct of the general structure (II); and

$$M-A-M \qquad (II)$$

(c) from less than about 12 to 0 mole percent of an adduct (III) containing two or more B moieties per molecule, wherein A is derived from polyisocyanate;

B is derived from polyahl;

M is derived from monoahl; and f is the number of isocyanate reactive groups formally present on the polyahl.

In a third aspect, this invention relates to a solvent-free two-step process for preparing an adduct containing a plurality of urethane linkages being a stable liquid at room temperature and being substantially free of isocyanate or isocyanate-reactive groups, which comprises reacting in a first step a polyisocyanate with a polyahl to provide an isocyanate-terminated intermediate, and in a second step reacting the said intermediate with a monoahl, wherein:

a) the polyisocyanate comprises at least two isocyanate moieties/molecule with a different reactivity to the polyahl;

b) the polyahl is an organic substance having a molecular weight of from about 200 to about 20000 and containing per molecule about two or more isocyanate-reactive functional groups being of —OH, —SH, —COOH, or —NHR where R is hydrogen or alkyl;

c) the monoahl is an organic substance containing one isocyanate-reactive functional groups being of —OH, —SH, —COOH, or —NHR where R is hydrogen or alkyl characterized in that:

i) for the first step, conducted in essentially anhydrous conditions and in the absence of a urethane-promoting catalyst, the polyahl is added at a controlled rate to the polyisocyanate such that the reaction temperature does not exceed 100° C. and the total amount of polyahl added is a stoichiometric equivalent or less with respect to the polyisocyanate; and ii) for the second step, the monoahl is added in a restricted amount sufficient to consume all isocyanate groups wherein such amount is determined by directly monitoring the reaction mixture for the presence of isocyanate functionality.

In a fourth aspect, this invention relates to an isocyanate-terminated intermediate obtained by contacting in essentially anhydrous conditions and in the absence of a urethane-promoting catalyst, a polyahl having a molecular weight of from about 200 to about 20000 and containing per molecule about two or more isocyanate-reactive functional groups being of —OH, —SH, —COOH, or —NHR where R is hydrogen or alkyl, with a polyisocyanate comprising at least two isocyanate moieties/molecule with a different reactivity to the polyahl, wherein the polyahl is added at a controlled rate to the polyisocyanate such that the reaction temperature does not exceed 100° C. and the total amount of polyahl added is a stoichiometric equivalent or less with respect to the polyisocyanate and the resulting intermediate, wherein said intermediate has an isocyanate content of from about 0.5 to about 5 weight percent, and based on total weight present of components (a), (b) and (c) to a total of 100 percent, comprises:

(a) from about 65 to 100 mole percent of an adduct of the general structure (IV);

(b) from less than about 35 to 0 mole percent of an adduct of the general structure (V); and

(c) from less than about 12 to 0 mole percent of an adduct (VI) containing two or more B moieties per molecule, wherein A is polyisocyanate;

B is polyahl; and f is the number of isocyanate reactive groups formally present on the polyahl.

In yet various other aspects, this invention relates to a formulation which comprises from about 1 to about 99 weight percent of the above mentioned adduct; and to the use of the adduct, or composition or formulation thereof as a lubricant, quenchant, surfactant, or thickener Such quenching and lubricating agents find value for example in the metal processing industry where they may be employed in aqueous or non aqueous conditions. Surfactants or tensioactive agents find value in the manufacture of cellular polyurethane polymers, providing for a uniform, fine cell size.

Specific Embodiments of the Invention

The adduct product of this invention is a substance, substantially free of any isocyanate functionality or any isocyanate-reactive group including hydroxyl, thiol, carboxylic acid, thiocarboxylic acid, or primary amine functionality, which is a liquid at room temperature, that is 25° C., and comprises a plurality of urethane linkages. The adduct can be represented by the structural formula (I).

wherein:

A is derived from polyisocyanate;

B is derived from polyahl;

M is derived from monoahl; and f is is the number of isocyanate reactive groups formally present on the polyahl.When the adduct is based on a difunctional polyahl it will have a linear structure; when based on a triol, it will have a branched or three limb structure, and so forth. For each polyisocyanate entity (A) incorporated into the adduct, at least two urethane linkages are introduced.With reference to the process for preparing such liquid adducts, to be discussed in detail hereinafter, the product of this invention will in most cases be a composition comprising predominantly an adduct of structure (I), with minor amounts of adducts corresponding to Structures (II) and (III). Adduct II corresponds to a polyisocyanate (A) fully reacted with a monoahl (M); Adduct III corresponds to a structure containing two or more polyahl (B) entities per molecule. It is to be appreciated that adduct III may acquire a highly complexed, branched structure when the functionality of B is greater than 2, wherein each branch nominally will be terminated with an monoahl derived entity. By way of example, structures of Adduct II and III are given below, in this case (III) comprising two or more B moieties is depicted as a linear adduct originating through the polyahl containing two isocyanate reactive groups/molecule.

where n≈1An adduct corresponding to structure (II) can result when polyisocyanate reacts uniquely with monoahl; an adduct corresponding to Structure (III) can result when multiple molecules of polyisocyanate are able to react with multiple molecules of polyahl prior to reaction with monoahl. The liquid urethane-containing adduct product, or composition, of this invention may be characterized in that it has a number average molecular weight of from about 600 to about 80000, preferably from about 1000 to about 60000, and more preferably from about 2000 to about 30000. When a composition, it can be further characterized in that it comprises substances corresponding to Structures (I), (II) and (III), based on total mole amount of said substances, in an amount of from: for (I), at least 65, preferably at least 75, more preferably at least 80, and up to 100 mole percent; for (II), less than about 35, preferably less than 25, more preferably less than 15, and most preferably 0 mole percent; and for (III), less than about 12, preferably less than about 10, more preferably less than about 7, yet more preferably less than about 5, and most preferably 0 mole percent. In a preferred embodiment the adduct composition may comprises substances (I), (II), and (III) in the mole percent ranges of from about 65 to about 90: from about 30 to about 5: from about 6 to 1 respectively, wherein the total is to 100. By reference to purity, it is understood that the end product has a low content of adducts represented by structures (II) and (III). During the present investigation it has been found that if the presence of structure (III) type substances can be minimized, then the resulting adduct is more likely to have a liquid characteristic at room temperature and especially when the polyahl used in the preparation of the adduct formally contained three or more isocyanate reactive groups/molecule. The adduct composition is related to the manufacturing process, and particularly to the method of preparation of the intermediate product, from polyahl and polyisocyanate, prior to reaction with monoahl.The adduct product of this invention can be prepared by a solvent-free two-step process which comprises a first step wherein a polyisocyanate is reacted, in the absence of a urethane-promoting catalyst, with a polyahl containing isocyanate-reactive groups to provide an isocyanate-terminated intermediate; and subsequently in a second step, reacting the isocyanate-terminated intermediate with a monoahl to provide the end product. The intermediate can be characterized in that it has an isocyanate content of from about 0.5 to about 5, preferably from about 1 to about 4 weight percent and is a composition which comprises structures (IV), (V), and (VI) represented by the structural formulae:

where n≧1 wherein:

A is derived from polyisocyanate;

B is derived from polyahl; and f is the number of isocyanate reactive groups formally present on the polyahl.

The proportions and amounts of (IV), (V), and (VI) are as given for (I), (II), and (III). Again, in this instance for the purpose of clarity adduct VI is depicted with a linear structure. However, as discussed for adduct III it is to be appreciated that adduct VI can also have a highly complexed branched structure.

A more detailed description of reactants and processing parameters are given hereinbelow.

The Polyisocyanate

The polyisocyanate used in the process to prepare the adduct product has at least two isocyanate moities/molecules and which can be distinguished by a difference in reactivity, with respect to the isocyanate-reactive group of the polyahl. The reactivity difference helps to optimize the obtention of a product having a narrow molecular weight distribution and reduces the potential for formation of substances corresponding to structures (III) and (VI). Suitable polyisocyanates can be aliphatic or preferably aromatic polyisocyanates and especially aromatic diisocyanates. A further advantage to using aromatic diisocyanates, where the relative reactivities of the individual isocyanate groups are different, is that it permits the amounts of free, non reacted, polyisocyanate (V) that may be present in the isocyanate-terminated intermediate to be limited to the subsequent advantage of material requirements for the second process step, and further to the value of the adduct in end applications. Exemplary of suitable aromatic polyisocyanates include toluene diisocyanate, methylene diphenylisocyanate and polymethylene polyphenylisocyanates. Preferred are polyisocyanates comprising isomers of toluene diisocyanate, of methylene diphenylisocyanate or mixtures thereof. In a highly preferred embodiment preferred, for reasons of relative isocyanate reactivity, is 2,4'-methylene diphenylisocyanate and especially 2,4-toluene diisocyanate, or mixtures comprising such diisocyanate.

The Polyahl

The polyahl used in the process comprises two or more isocyanate-reactive functional groups per molecule where such functional groups include —OH, —SH, —COOH, or —NHR, with R being hydrogen or an alkyl moiety. Polyahls bearing —OH functionality are preferred. The polyahl may contain up to about 8 such functional groups per molecule, preferred is to use polyahls which contain from about 2 to about 8, preferably from about 3 to about 8, and more preferably from about 3 to about 6 functional groups per molecule.

The polyahl used in the process of this invention has a molecular weight of from about 200 to about 20000. The molecular weight of the polyahl preferably is from about 500, more preferably from about 1000, and yet more preferably from about 2000; and preferably up to about 15000, and more preferably up to about 10000. In a preferred embodiment the polyahl is a polyester or particularly a polyoxyalkylene polyol where the oxyalkylene entity comprises oxyethylene, oxypropylene, oxybutylene or mixtures of two or more thereof, including especially oxypropylene-oxyethylene mixtures. Alternative polyols that may be used in the invention include polyalkylene carbonate-based polyols and polyphosphate-based polyols. The nature of the polyol selected depends on the desire whether or not to impart some water solubility to the adduct, which can be advantageous for certain applications and disadvantageous for other applications. Water solubility can be enhanced by selection of polyols having a lower molecular weight or an elevated oxyethylene content.

Suitable polyoxyalkylene polyols are exemplified by various commercially available polyols as used in polyurethane, lubricant, surfactancy applications and include polyoxypropylene glycols designated as VORANOL™ P-2000 and P-4000 with respectively molecular weights of 2000 and 4000; polyoxypropylene-oxyethylene glycols such as DOWFAX™ DM-30 understood to have a molecular weight of about 600 and an oxyethylene content of about 65 weight percent, and SYNALOX™ 25D-700 understood to have a molecular weight of about 5500 and an oxyethylene content of about 65 weight percent, all available from The Dow Chemical Company; polyoxyethylene triols available under the trademark TERRALOX™ and designated as product WG-98 and WG-116 understood to have a molecular weight of about 700 and about 980, respectively, polyoxypropylene-oxyethylene triols designated as VORANOL™ CP 1000 and CP 3055 understood to have respectively a molecular weight of about 1000 and about 3000, and VORANOL™ CP 3001 understood to have a molecular weight of about 3000 and an oxyethylene content of about 10 weight percent and VORANOL™ CP 6001 understood to have a molecular weight of about 6000 and an oxyethylene content of about 15 weight percent, all available from The Dow Chemical Company; polyoxypropylene hexols including VORANOL™ RN-482 understood to have a molecular weight of about 700, and polyoxyethylene hexols including TERRALOX™ HP-400 understood to have a molecular weight of about 975, both available from The Dow Chemical Company; higher functionality polyether polyols including those based on carbohydrate initiators such as, for example, sucrose and exemplified by VORANOL™ 370 available from The Dow Chemical Company.

The Monoahl

The monoahl used in the process is an organic substance containing one isocyanate-reactive functional group per molecule being of —OH, —SH, —COOH, or —NHR where R is hydrogen or alkyl. Preferred is a monoahl having as the isocyanate-reactive functionality a hydroxyl group, hereinafter referred to an a monol. In addition to the isocyanate-reactive functional group the monoahl optionally may contain alternative functionality which under the conditions of the present invention are not considered as being isocyanate reactive. Exemplary of such alternative functionality can be alkene, alkyne, halogen.

The monol used in the process is chosen with consideration the intended end application of the products resulting from the process. When it is desired to influence, for example, the water miscibility of the adduct product an appropriate hydrophilic or hydrophobic monol is used. Any hydrophilic/hydrophobic characteristics introduced by way of the polyahl will also contribute to the overall characteristics of the adduct. Similarly when it is desired to exercise additional control of for example the tensioactive properties of the adduct, an appropriate branched or fluorine or silicon containing monol is chosen.

Preferred monols for use in this invention are polyoxyalkylene monols with a molecular weight of from about 150 to about 6000: preferably from about 250, more preferably from about 500, yet more preferably from about 1000; and preferably up to about 5000, more preferably up to about 4000. The oxyalkylene entity of the monol oxyalkylene entity comprises oxyethylene, oxypropylene, oxybutylene or mixtures of two or more. As an alternative to polyoxyalkylene-based monoahls, or monols, substances containing polycarbonate, polysiloxane or polyphosphate moities may also be employed.

In a preferred embodiment of this invention the polyisocyanate is toluene diisocyanate comprising, substantially, the 2,4-isomer; the polyahl is a polyoxyalkylene polyol, especially a polyoxyethylene-oxypropylene polyol containing from 3 to 6 hydroxyl groups; and the monoahl is a polyoxyalkylene monol especially containing oxybutylene groups. Particularly preferred monols, when intending to enhance hydrophobic characteristics, are those comprising the oxybutylene entity, especially in an amount of more than 50 weight percent by total weight of the monol.

The Process

The method of preparing the urethane-containing adduct is a two step process comprising a first and a second step, optionally between the first and second step is an intermediate step.

The first step relates to the preparation of an isocyanate-terminated intermediate by reacting the polyisocyanate with the polyahl at a reaction temperature which does not exceed 100° C., in essentially anhydrous conditions. By essentially anhydrous conditions it is meant less than about 1500, preferably less than about 750, more preferably less than about 350 ppm of water. The reaction temperature advantageously is from about 20° C., more preferably from about 35° C.; and preferably up to about 80° C., more preferably up to about 70° C. Operating in such a temperature range provides for an optimum reaction rate without loss of the difference in the relative reactivities of the individual isocyanate groups of the polyisocyanate. At higher temperature, the beneficial effect of the relative isocyanate reactivities can be substantially diminished, and additionally isocyanate may be consumed by an undesirable allophanate reaction. The polyahl is added at a controlled rate to the polyisocyanate such that the reaction temperature does not exceed 100° C., and the total amount of polyahl added is a stoichiometric equivalent or less with respect to the polyisocyanate. The total amount of polyahl advantageously does not exceed about 0.99, preferably does not exceed about 0.95 of an equivalent; and advantageously is at least 0.4, preferably at least 0.6, and more preferably from about 0.85 of an equivalent per equivalent of isocyanate. In a highly preferred embodiment when the polyahl is a polyol it is present in a total amount corresponding to from about 0.85 to about 0.95 of an equivalent.

As already mentioned, the first process step is conducted in essentially anhydrous conditions and in the absence of a processing aid, as defined hereinabove. To minimize potential gel formation, solidification, it is advantageous to use polyahls which do not contain any catalyst or catalyst finishing residues, for example potassium acetate, which might promote urethane formation or isocyanate dimerization or trimerization. Additionally to minimize gel formation when preparing the intermediate it is advantageous to use polyahls, especially polyols, that have an acid content; such procedures when preparing isocyanate-terminated prepolymers are known from the general art and need not be further described. In the course of the present investigations it is found that the absence, in the first process step, of a urethane-promoting catalyst is particularly advantageous with respect to exercising some control on the formation of substances corresponding to Structure (VI), and eventually structure (III) of the adduct composition.

When the resulting isocyanate-terminated intermediate has a higher free, unreacted, isocyanate content, corresponding to Structure (V), before proceeding with the second step of the process it can be advantageous to reduce such content by, for example, distillation or extraction techniques using suitable solvents including pentane or hexane. Free, unreacted diisocyanate can participate in the second process step providing capped products, the presence of which in the final product may be detrimental to performance in certain end applications.

In the second step of the process, the isocyanate-terminated intermediate is reacted with a controlled amount of a monoahl to provide the adduct product. The controlled amount is such to essentially convert all isocyanate functionality without leading to the accumulation of any isocyanate-reactive functionality in the end adduct product. The amount required to achieve this result is determined by adding in increments the monoahl and directly monitoring the reaction mixture for presence of free reactive functionality, in this case isocyanate functionality. The incremental addition continuing until the presence of isocyanate functionality is reduced to a minimum or zero, without accumulation of any other isocyanate reactive functionality.

In the process of the present invention it is preferred to employ on-line, insitu, spectrometry techniques. Especially of value is infrared spectrometry which permits the ready observation of the presence of isocyanate functionality by observing absorption at wavelengths of, for example, from about 2200 to about 2300 cm-$^1$. Observation at other wavelengths in, for example, near-IR frequencies is also possible. Use of a fourier transfer infrared spectrometer provides a convenient means of rapid observation for isocyanate functionality directly in the reaction vessel thus avoiding the need to take isolated samples. Traditional monitoring methods involving isolation and subsequent reactive chemical analysis, for example by titration itself subject to operator error, of material is avoided.

For the second step, the process temperature is chosen for convenience of reaction time and can be greater than 100° C. without detriment to the performance of the adduct in end applications. In general, exposure to a temperature greater than 100° C. should be minimized for the purpose of avoiding undesirable side reactions including allophanate formation. The reaction of the isocyanate-terminated intermediate with the monoahl can, if desired, be accelerated by use of a suitable urethane-promoting catalyst. Representative of such catalysts include tertiary amine compounds and organotin compounds as used when preparing for example polyurethane foam by reaction of a polyisocyanate with a polyol.

The above described two-step process is the preferred method of manufacturing the adduct as it provides the possibility of manufacturing a standard intermediate master batch which can be reacted with various monoahls selected to provide adducts suited to different application areas. Other methods can be envisaged including for example first reacting the monoahl with polyisocyanate to provide an alternative isocyanate-terminated intermediate and subsequently reacting this with the polyahl. When the second step has been monitored using the isocyanate IR adsorption band, such an alternative procedure may not provide for an end product being substantially free of isocyanate-reactive groups. In such an alternative reaction sequence, it will be necessary to adapt the direct online, insitu, method such that it provides for monitoring of the amount of polyahl and avoidance of accumulation of isocyanate-reactive moieties yet not leave any unreacted isocyanate functionality.

The invention is illustrated by the following examples in which all parts and percentages are by weight, unless otherwise stated.

EXAMPLE 1 (ABSENCE OF CATALYST IN FIRST STEP)

This example teaches the preparation of an adduct by first reacting 2,4-toluene diisocyanate (95% purity) with a glycerine-initiated polyoxypropylene-oxyethylene triol (molecular weight 2150, EO content 53 wt %, random) to provide an intermediate product which is subsequently reacted with a polyoxybutylene monoalcohol of 500 molecular weight, SYNALOX™ OA-15, available from The Dow Chemical Company.

The toluene diisocyanate, 20.2 parts, was introduced into a closed reactor equipped with a stirrer, nitrogen supply, FTIR immersion probe and external temperature control mantel. The toluene diisocyanate was brought to a temperature of 50° C. and 75 parts of polyol added in increments at a rate such that the contents of the reactor do not exceed 60° C. The polyol is present in an amount of 0.45 of an equivalent per equivalent of polyisocyanate. On completion of the addition of the polyol, 0.6 parts of dibutyltin dilaurate was added followed by rapid incremental additions of the polyoxybutylene monoalcohol until the FTIR spectrum did not indicate any absorption at 2273 cm$^{-1}$ (isocyanate band). After the addition of a total of 56.95 parts of polyoxybutylene monoalcohol no isocyanate absorption was observed in the IR spectrum. The resulting product is a stable liquid at room temperature having a molecular weight of about 4140, and being substantially free of isocyanate or hydroxyl end groups.

EXAMPLE 2 (ABSENCE OF CATALYST IN THE FIRST STEP)

In this example, the same reactants and general procedure as given for Example 1 has been used, but with a reverse addition sequence.

In the first step, 20.2 parts of 2,4-toluene diisocyanate is reacted with a total of 56.95 parts of the polyoxybutylene monoalcohol. Subsequently the resulting intermediate is reacted, in the presence of 0.6 part of dibutyltin dilaurate with the glycerine-initiated polyoxypropylene-oxyethylene triol. The polyol is added in increments until no isocyanate absorption was observed in the IR spectrum, which occurred after the addition of a total of 120 parts of polyol. The resulting product is a liquid, but is observed to have a hydroxyl content.

Comparative Example A (with catalyst in the first step)

In this example, the same reactants and general procedure as given for Example 1 has been used.

In the first step, 20.2 parts of 2,4-toluene diisocyanate is mixed with 0.6 part of dibutyltin dilaurate and the mixture brought to a temperature of 50° C. and incremental addition of the polyol started. After the addition of polyol to a total amount of only 55 parts, the synthesis procedure was terminated due to the formation of a gel/solid.

Comparative Example B (with catalyst in the first step)

In this example, the same reactants and general procedure as given for Example 1 has been used, but with a reverse addition sequence.

In the first step, 20.2 parts of 2,4-toluene diisocyanate is mixed with 0.6 part of dibutyltin dilaurate and the mixture brought to a temperature of 50° C. prior to the incremental addition of a total of 56.95 parts of the polyoxybutylene monoalcohol over a period of about one hour. Subsequently, a total of 75 parts of the polyoxyethylene-oxypropylene polyol was added incrementally to the product of the first step. After about 40 minutes the viscosity of the mixture started to increase and shortly after this a gelled, solid, product resulted.

Examples 1, 2 and Comparative Examples A and B demonstrate the importance of having in the first process step the absence of a urethane-promoting catalyst. The examples also demonstrate the value of first reacting the polyisocyanate with polyahl, and then subsequently reacting the intermediate with a monoahl.

EXAMPLE 3

In order to obtain a better understanding of the role of the dibutyltin dilaurate in the preparation procedure, a series of isocyanate-terminated intermediate products has been prepared.

A series of isocyanate-terminated intermediates has been prepared using the general procedure as given in Example 1, first step, by reacting 2,4-toluene diisocyanate (95% purity) with a polyoxyethylene-oxypropylene diol (molecular weight 4000, EO content 50 wt %, primary hydroxyl content>70%) in the absence of a urethane-promoting catalyst. The proportion of polyol to polyisocyanate is such to provide 0.91, 0.77, 0.66, 0.5 and 0.27 equivalent of polyol per equivalent of polyisocyanate. A parallel comparative series of isocyanate-terminated intermediates is prepared form the same reactants in the same proportions but in the presence of a catalyst, dibutyltin dilaurate. The resulting intermediate compositions are analyzed using $^{13}$C NMR analytical techniques to establish the proportion of products corresponding to structures (IV), (V) and (VI).

Table 1 reports the observations, for which the following remarks can be made. With a desire to enhance the formation of substances corresponding to Structure (IV) it is advantageous to employ the polyol in an equivalent amount approaching that of the polyisocyanate. At high equivalency rates the occurrence of free polyisocyanate (Structure V) is reduced, however it is noted that the occurrence of a chain extended substance (VI) increases. It is the presence of such substances corresponding to structure (VI) which generally cause gellation or solidification of product, especially when employing higher functionality reactants. From the comparison of procedures conducted in the presence and absence of catalyst, it is found that the presence of catalyst favors the undesirable formation of structure (VI) type substances. Accordingly, in this invention no urethane-promoting catalyst should be present in the first step of the process. It is also surprisingly found, when employing the polyol in an amount of more than about 0.8 equivalent per equivalent of polyisocyanate, that in the absence of catalyst a greater formation of the desired intermediate (IV) is observed. Although intermediates prepared in the absence of a catalyst may have a higher free polyisocyanate content (V), such substance optionally can be removed as discussed hereinabove providing for an intermediate composition in which the amounts of non desirable substance (V) has been reduced.

| Intermediate | Catalyst | Equivalents of polyol | Mole % of Structure (IV) substance | Mole % of Structure (V) substance | Mole % of Structure (VI) substance |
|---|---|---|---|---|---|
| I-1 | no | 0.91 | 83.5 | 11.5 | 5.0 |
| I-a* | yes | 0.91 | 81.6 | 8.9 | 9.3 |
| I-2 | no | 0.77 | 75.3 | 22.0 | 2.7 |
| I-b* | yes | 0.77 | 80.1 | 16.0 | 3.9 |
| I-3 | no | 0.66 | 66.9 | 30.8 | 2.3 |
| I-c* | yes | 0.66 | 72 | 25.5 | 2.4 |
| I-4 | no | 0.5 | 52.5 | 46.2 | 1.3 |
| I-d* | yes | 0.5 | 57.1 | 42.1 | 0.9 |
| I-5 | no | 0.27 | 30.5 | 69.6 | / |
| I-e* | yes | 0.27 | 34 | 66.0 | / |

*Not an example of this invention

EXAMPLE 4

A number of liquid urethane-containing adducts have been prepared according to the general procedure of a Example 1 using different polyisocyanate, polyahls and monoahls. Table 2 summarizes the adducts which have been prepared.

| Adduct | Polyisocyanate type | Polyahl type | Monoahl type | Theoretical Molecular Wt. |
|---|---|---|---|---|
| 4.1 | A | A | A | 5076 |
| 4.2 | A | A | B | 4708 |
| 4.3 | A | A | c | 5348 |
| 4.4 | A | A | D | 8348 |
| 4.5 | A | A | E | 5644 |
| 4.6 | A | A | F | 6348 |
| 4.7 | A | B | A | 3764 |
| 4.8 | A | B | B | 2702 |
| 4.9 | A | B | C | 4172 |
| 4.10 | A | B | D | 8672 |
| 4.11 | A | B | E | 4616 |
| 4.12 | A | B | F | 5672 |
| 4.13 | A | C | C | 9169 |

Polyisocyanate A: 2,4- , 2,6-toluene diisocyanate (95:5)
Polyahl A: a 4000 molecular weight polyoxypropylene-oxyethylene diol with a 40 weight percent oxyethylene content.

EXAMPLE 5

The lubrication performance of Products 4.9 and 4.10 has been compared to that of commercially available fluids SYNALOX™ 50–300B and SYNALOX™ 100-D280.

SRV observations (according to DIN 51834):

| | |
|---|---|
| Product 4.9: | viscosity, 5300 cSt at 40° C. |
| | friction 0.13 mu |
| | max load 730 Newton |
| Product 4.10 | viscosity, 8500 cSt at 40° C. |
| | friction 0.13 mu |
| | max load 680 Newton |
| SYNALOX ™ 50-300B | friction 0.12 mu |
| | max load 400 Newton |
| SYNALOX ™ 100-D280 | friction 0.12 mu |
| | max load 430 Newton |
| Four Ball Scar Test (according to DIN 51350): | |
| Product 4.9: | no scar detected (<0.1 mm) |
| Product 4.10 | no scar detected (<0.1 mm) |
| SYNALOX ™ 50-300B | 0.55 mm scar |
| SYNALOX ™ 100-D280 | 0.59 mm scar |

In the SRV (swing, friction, wear) observations, normally the friction increases with viscosity, the adducts of this invention having high viscosity are found, unexpectedly to have equivalent friction properties as lower viscosity adducts. Such a finding provides a possibility of high temperature lubrication or quenching end uses. The further observation of little or no scar formation indicates that the products of this invention exhibit excellent film formation under running conditions.

EXAMPLE 6

In this example the ability of products of this invention to function as tensioactive agents in the preparation of rigid polyurethane foam is demonstrated.

Polyurethane foam is prepared using a low pressure machine with the below given formulation. Polyurethane foam having a molded density of from 30 to 32 kg/m$^3$ is prepared and the cell size and initial thermal insulation performance observed.

| | |
|---|---|
| 100 pbw | oxypropylene adduct of sorbitol and glycerine having an average hydroxyl number of 261 |
| 1.0 pbw | N,N-dimethylcyclohexylamine |
| 0.10 pbw | NIAX A-1, a proprietary amine-based urethane catalyst from OSi. |
| 0.6 pbw | CURITHANE 206, a proprietary amine-based urethane catalyst from The Dow Chemical Company |
| 4.0 pbw | water |
| SURFACTANT - various, see following Table. | |
| 152 pbw | VORANATE M220, a polymeric MDI available from The Dow Chemical Company (Index 120) |

The observations reported in the attached table clearly demonstrate the ability, under non optimized conditions, of the products of this invention to function as surfactants. Surfactant L6900 is a commercially available silicon-based surfactant commonly used when preparing polyurethane foam.

| Surfactant (pbw) | Cell Size (mm) | Initial Thermal Conductivity mW/m.K) |
|---|---|---|
| none | 0.8 | 34.8 |
| L6900* (2.5 pbw) | 0.44 | 21.6 |
| Product 4.4 (2.5 pbw) | 0.52 | 22.2 |

| Surfactant (pbw) | Cell Size (mm) | Initial Thermal Conductivity mW/m.K) |
|---|---|---|
| Product 4.10 (0.9 pbw) | 0.66 | 24 |

What is claimed is:

1. A urethane-containing adduct composition which is a liquid at room temperature and the reaction product of a monoahl with an isocyanate-terminated intermediate obtained by coupling a polyisocyanate with a polyahl, based on total mole present of components (a), (b) and (c) and to a total of 100 percent, comprises (a) from about 65 to 100 mole percent of an adduct of the general structure (I);

B—(A—M)$_f$     (I)

(b) from less than about 35 to 0 mole percent of an adduct of the general structure (II); and

M—A—M     (II)

(c) from less than about 12 to 0 mole percent of an adduct (III) containing two or more B moieties per molecule,

M—A—(B—A)$_n$—B—A—M     (III)

wherein

A is derived from polyisocyanate;

B is derived from polyahl;

M is derived from monoahl;

f is the number of isocyanate reactive groups formally present on the polyahl; and n≧1.

2. The composition of claim 1 wherein component (a) is present in an amount of from about 65 to about 90 mole percent; component (b) is present in an amount of from about 30 to about 5 mole percent; and component (c) is present in an amount of from about 6 to about 1 mole percent.

3. A solvent-free two-step process for preparing an adduct containing a plurality of urethane linkages where said adduct is a stable liquid at room temperature and is substantially free of isocyanate or isocyanate-reactive groups, which comprises reacting in a first step a polyisocyanate with a polyahl to provide an isocyanate-terminated intermediate, and in a second step reacting the said intermediate with a monoahl, wherein:

a) the polyisocyanate comprises at least two isocyanate moieties/molecule with a different reactivity to the polyahl;

b) the polyahl is an organic substance having a molecular weight of from about 200 to about 20000 and containing per molecule about two or more isocyanate-reactive functional groups being of —OH, —SH, —COOH, or —NHR where R is hydrogen or alkyl;

c) the monoahl is an organic substance containing one isocyanate-reactive functional groups being of —OH, —SH, —COOH, or —NHR where R is hydrogen or alkyl characterized in that:

i) for the first step, conducted in essentially anhydrous conditions and in the absence of a urethane-promoting catalyst, the polyahl is added at a controlled rate to the polyisocyanate such that the reaction temperature does not exceed 100° C. and the total amount of polyahl added is a stoichiometric equivalent or less with respect to the polyisocyanate; and ii) for the second step, the monoahl is added in a restricted amount sufficient to consume all isocyanate groups wherein such amount is determined by directly monitoring the reaction mixture for the presence of isocyanate functionality.

4. The process of claim 3 wherein the polyisocyanate is an aromatic diisocyanate selected from the group consisting of 2,4-toluene diisocyanate and 2,4'-methylene diphenylisocyanate.

5. The process of claim 3 wherein the polyahl has a molecular weight of from about 1000 to about 15000 and contains per molecule from about 2 to about 8 hydroxyl groups.

6. The process of claim 5 wherein the polyahl is a polyoxyalkylene polyol and where the oxyalkylene moiety is selected from the group consisting of an oxyethylene, oxypropylene, oxybutylene linkage, and mixtures of two or more thereof.

7. The process of claim 6 wherein the polyoxyalkylene polyol is an oxyethylene-oxypropylene polyol containing from about 3 to about 8 hydroxyl groups per molecule.

8. The process of claim 3 wherein the reaction temperature for the first step is from about 20° C. to about 80° C.

9. The process of claim 3 wherein for the first step the total amount of polyahl added is from about 0.5:1 to about 1.0:1 equivalents per equivalent of polyisocyanate.

10. The process of claim 9 wherein for the first step the total amount of polyahl added is from about 0.85:1 to about 0.95:1 equivalents per equivalent of polyisocyanate.

11. The process of claim 3 where for the first step, a polyisocyanate selected from 2,4-toluene diisocyanate or 2,4'-methylene diphenylisocyanate is reacted, at a temperature of from about 20° C. to about 80° C., with a polyahl consisting of a polyoxyalkylene polyol having a molecular weight of from about 1000 to about 15000 and containing per molecule from about 2 to about 8 —OH functional groups, and wherein the total amount of polyol added is from about 0.85:1 to about 0.95:1 equivalents per equivalent of polyisocyanate.

12. The process of claim 3 wherein the monoahl is an organic substance containing one isocyanate-reactive functional group per molecule being selected from the group consisting of —OH, —SH, —COOH, and —NHR where R is hydrogen or alkyl.

13. The process of claim 12 wherein the monoahl is an —OH containing substance.

14. The process of claim 13 wherein monol is a polyoxyalkylene monol having a molecular weight of from about 250 to about 6000 and wherein the oxyalkylene entity is selected from the group consisting of oxyethylene, oxypropylene, oxybutylene and mixtures of two or more thereof.

15. The process of claim 14 wherein the polyoxyalkylene monol comprises the oxybutylene entity, in an amount of more than 50 weight percent by total weight of the monol.

* * * * *